Figure 1:
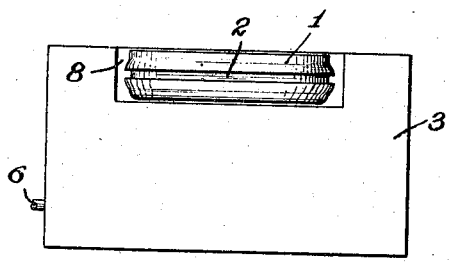

L. MAMBOURG.
GLASS PLANT.
APPLICATION FILED SEPT. 22, 1915.

1,174,261.

Patented Mar. 7, 1916.
2 SHEETS—SHEET 1.

Witness:
Geo Johnson

Leopold Mambourg
Inventor
by James W. See
Attorney

L. MAMBOURG.
GLASS PLANT.
APPLICATION FILED SEPT. 22, 1915.

1,174,261.

Patented Mar. 7, 1916.
2 SHEETS—SHEET 2.

Witness:
Geo Johnson

Leopold Mambourg
Inventor
by James W. See
Attorney

UNITED STATES PATENT OFFICE.

LEOPOLD MAMBOURG, OF COLUMBUS, OHIO, ASSIGNOR OF ONE-THIRD TO W. O. TAYLOR AND ONE-THIRD TO SYLVIO CASPARIS, BOTH OF COLUMBUS, OHIO.

GLASS PLANT.

1,174,261. Specification of Letters Patent. Patented Mar. 7, 1916.

Application filed September 22, 1915. Serial No. 51,907.

*To all whom it may concern:*

Be it known that I, LEOPOLD MAMBOURG, a citizen of the United States, residing at Columbus, Franklin county, Ohio, have invented certain new and useful Improvements in Glass Plants, of which the following is a specification.

This invention relates to glass plants in which a large body of glass is held in melted condition in a melting tank from which portions are dipped and delivered into a drawing-pot disposed in a pot-heating furnace, a drawing machine dipping its bait down into the drawing-pot, the bait rising from the drawing-pot and producing a cylinder of glass which is cut off from the drawing-pot at proper time and then cut off from the bait to be slitted and flattened.

Taking the general arrangement, as above indicated, I may make mention of a plant and method of procedure which may be assumed as the best in practical use. The drawing-pot is disposed on trunnions in a pot-furnace; the charge dipped from the tank by a cooled ladle is delivered into the drawing-pot; the bait dips into the drawing-pot and draws the cylinder; the drawing continues until the capacity of the drawing motion is reached or until the glass in the pot is too cold for further drawing, notwithstanding the heat supplied by the pot-furnace; the cylinder is cut off at its base and the afterbirth falls to the drawing-pot; the drawing-pot, which is double faced, is then reversed; a new charge is dipped from the tank and delivered to the drawing-pot to be operated upon by the drawing machine as before; the cooled glass and afterbirth in the lower member of the reversed pot is fused out by the heat of the pot-furnace and drops therefrom; this discharged matter is allowed to cool sufficiently to be transported; it is then transported to the charging-opening in the tank for remelting. The tank is provided with suitable gas appliances and draft devices for melting the glass and crane facilities are provided for handling the ladle.

In the system just described a reversible drawing-pot is required, and the glass dropped from the reversed pot must be cooled prior to recharging, a very considerable loss of sensible heat in the glass resulting. Furthermore, the cooling and transportation of the waste glass from the drawing furnace to the distant end of the tank introduces the liability of such glass taking up impurities which may have a blistering effect upon the ultimate glass production, and the transportation of the dipped glass from the tank to the drawing-pot involves similar liabilities, in addition to which there is an undesired disturbance of the glass in its discharge from the dipper to the drawing-pot, as well as a material loss of temperature in the glass.

In my improved plant I use the pot itself as a dipper, and I provide for the getting of the waste glass from the drawing-pot back into the tank with a minimum loss of sensible heat and with a minimum chance for the gathering of impurities. I am here setting forth my improvements in a typical and somewhat diagrammatic showing. My improvements will be readily understood from the following description taken in connection with the accompanying drawings in which:—

Figure 2:
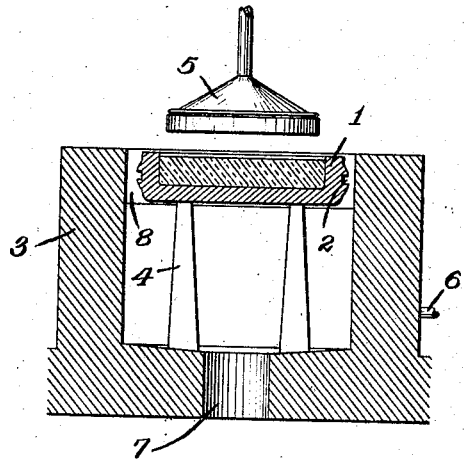
Figure 3:
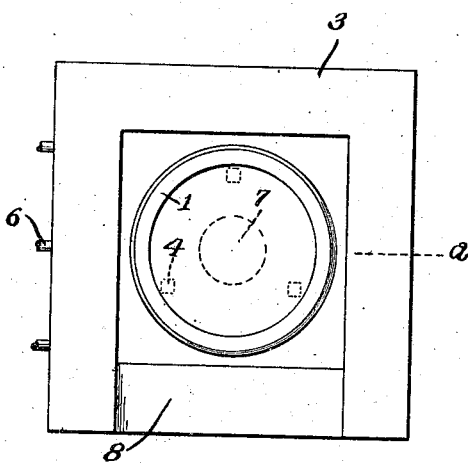
Figure 4:
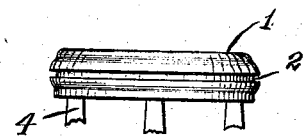
Figure 5:
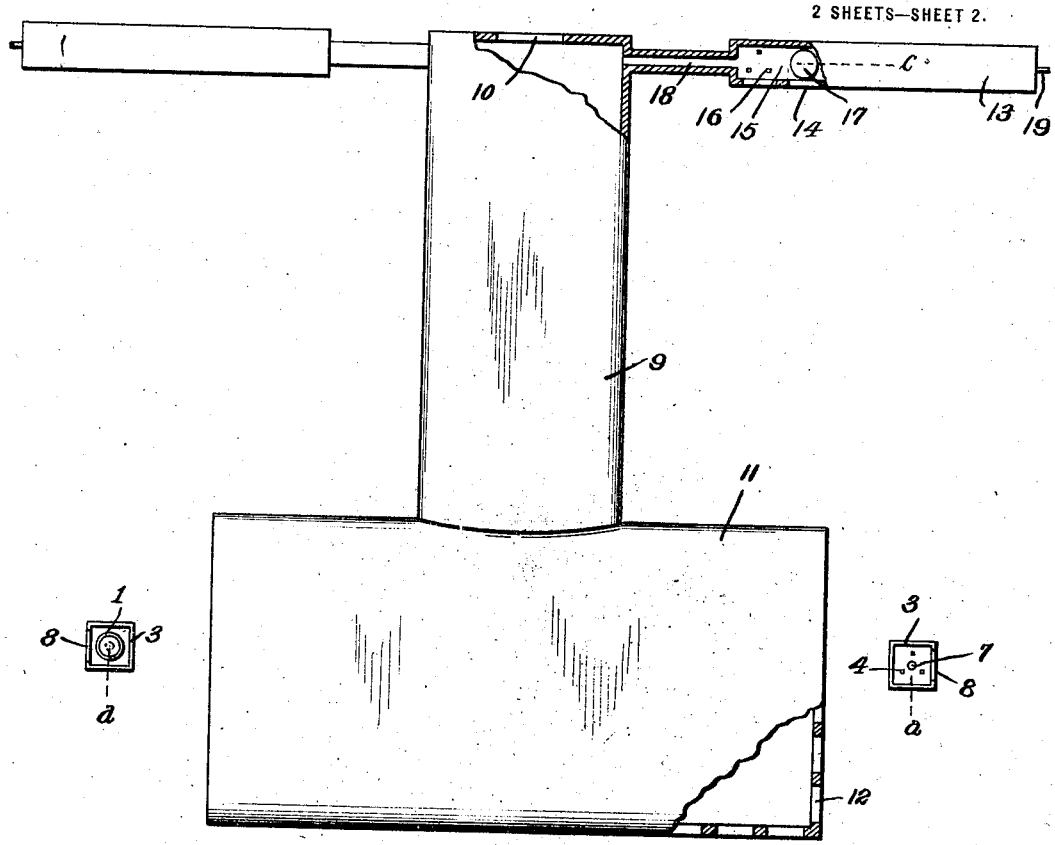
Figure 6:
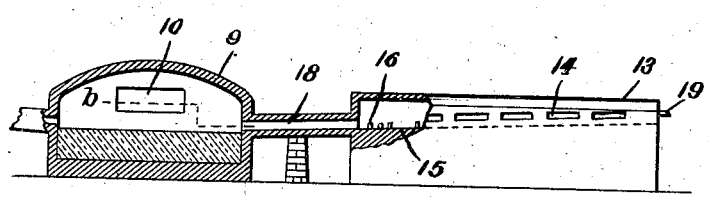

Figure 1 is a front elevation of a pot-furnace with its drawing-pot: Fig. 2 a vertical section of the same, viewed from the rear, in conjunction with a typical bait of a drawing machine, the section being in the plane of line *a* of Figs. 3 and 5; Fig. 3 a plan of a pot-furnace with the drawing-pot in position: Fig. 4 a front elevation of a drawing-pot on its supporting piers in the pot-furnace: Fig. 5 a plan of a typifying plant, portions appearing in the plane of line *b* of Fig. 6: and Fig. 6 a front elevation of one of the pot reheaters in conjunction with the tank, portions appearing in the plane of line *c* of Fig. 5.

In the drawings:—1, indicates a drawing-pot: 2, engaging devices upon the periphery of the drawing-pot to permit of the pot being grasped and handled, either side up, by means of suitable crane-supported tongs: 3, a pot-furnace adapted to receive the pot in its upper portion: 4, piers in the pot-furnace for the support of the pot: 5, the bait of a drawing machine adapted to dip down into the molten glass in the pot in the pot-furnace: 6, the usual gas-supply pipe for supplying gas to the pot-furnace: 7, a discharge hole in the floor of the pot-furnace: and 8, an opening in the top of one wall of the pot-furnace to permit the insertion therein of the pot with its charge of molten glass.

The drawing-pot with its charge of molten glass is to have the bait of the drawing machine dipped down into the glass and draw upwardly therefrom the glass cylinder in the usual manner, the heat supplied to the pot-furnace by the gas burning therein maintaining the glass in the pot at desired temperature, so far as is feasible. If, as may sometimes occur, there is any slopping over of glass from the drawing-pot it goes down into the pot-furnace and is discharged through the discharge hole 7 to be dealt with in the usual manner, though in many cases no glass will go from the drawing-pot to the pot-furnace. The draw will continue until the ultimate draw has been reached or the glass in the pot has become too much chilled for further drawing. The draw having been completed, and the afterbirth cut off, the pot contains a mass of unused and more or less chilled glass along with the afterbirth. The pot, with whatever glass it contains, is now to be withdrawn from the pot-furnace and transferred to a reheating furnace and inverted and the glass therefrom drained back into the tank, another part of molten glass being brought to the pot furnace, ready for a new draw. My improvements contemplate a number of pot-furnaces and drawing machines, and a sufficient number of drawing pots to take care of all of the drawing machines.

Continuing with the drawings:—9, indicates the melting tank, which may be of usual construction and which should be provided with the usual heating and draft provisions: 10, the charging opening at the heel of the tank: 11, the nose of the tank from which the glass is to be dipped by the drawing-pots, this nose being illustrated as of T-form adapted to have glass dipped from its front or from its ends: 12, openings in the nose of the tank at the ends and front of the extension 11, these openings being each of a size adapted to permit of a drawing-pot being introduced into the tank through them: 13, reheating furnaces at the charging end of the tank; 14, openings in the reheating furnaces to permit the insertion therein of the pots carried thereto from the pot furnaces: 15, the sloping floors of the reheating furnaces, the same sloping downwardly toward the tank: 16, piers projecting up from the floors of the reheating furnaces and adapted to support pots disposed rim downward in the reheating furnaces: 17, the bottom of a pot disposed bottom up, in one of the reheating furnaces: 18, ducts leading from the reheating furnaces to the tank and sloping toward the tank, the arrangement of the ducts 18 and the floors of the reheating furnaces being such that molten glass will flow from the reheating furnaces to the tank at a point not higher than the level of the molten glass in the tank: and 19, typifying gas pipes for supplying gas to the reheating furnaces.

In the improved plant there may be any suitable number of drawing machines and pot-furnaces, the nose of the tank, and the reheating furnaces being designed accordingly. It is, of course, to be assumed that the openings in the tank will have the usual doors for closing them, and that the tank will be provided with the heating and draft accessories usual in connection with glass-melting tanks. In Fig. 5 I illustrate the nose of the tank as being provided with six of the openings 12 at its ends and twelve of these openings at its front, giving twenty-four openings in all, and I have illustrated the two reheating furnaces 13 as each being provided with six of the openings 14 for the insertion and withdrawal of the drawing pots, and it is to be assumed that suitable crane facilities will be provided for handling the tongs which grasp the drawing pots in dipping them into the tank and in placing them in the pot-furnaces and in removing them from the pot furnaces to the reheating furnaces. In Fig. 5 I have shown one of the pot-furnaces at the left of the nose of the tank, with a drawing-pot in position therein, and I have shown a pot-furnace at the right of the nose of the tank, without any pot. These two furnaces may typify positions of fixed drawing machines, or positions to which drawing machines, if portable, may be brought, and there may be as many of these pot-furnaces as is deemed advisable.

Looking at Fig. 5 it is seen that the right hand one of the pot-furnaces 3 is idle, that is to say, there is no pot in it. The pot is seen bottom up at 17 in the right hand reheating furnace. The reheating furnace is heated by gas and the same draft apparatus which draws on the melting tank draws through the reheating furnaces. Pot 17 may be assumed as having had all of the glass melted out of it and drained down into the tank. This pot 17, or any other pot in either of the reheating furnaces may now, by means of appropriate tong and crane facilities, be withdrawn from its reheating furnace and inserted into any one of the openings 12 in the nose of the tank and, by proper manipulation, be employed as a dipper to gather from the tank a proper charge of molten glass, the dipper-pot being then withdrawn from the tank and placed in the empty pot-furnace, or any one of the empty pot-furnaces. The drawing machine over the pot-furnace is now to operate on the glass in the pot in the usual manner, the base of the glass cylinder and the afterbirth being cut off at the completion of the draw. This cut off glass and afterbirth settles in the pot along with such unconsumed glass as may have remained in the pot by reason of its having been unneeded, or too cooled for drawing. This pot is now taken from the pot-furnace and transported to and inserted into the reheating furnace and turned upside down and rested on the piers 16, all the glass in the pot being melted out by the action in the reheating furnace, the molten glass flowing out of the reheating furnace and down into the tank, leaving the pot heated and in condition for the next dipping and drawing operation pertaining to that pot. When the pot is withdrawn from the reheating furnace and inserted into the tank for use as a dipper, it is in hot condition, and when the pot, after the draw, is transported to the heating furnace, it carries with it all of the sensible heat of the glass within it, there thus being no material cooling of waste glass between the pot and its re-charge to the tank, and no material liability for this waste glass to accumulate impurities which may affect the character of the glass. There may, if desired, be a pot-furnace and a drawing machine for each of the dipping openings in the nose of the tank, or the general work of the plant may be carried on in such order that the pots are taken from pot-furnaces to the reheating furnaces and then to dipping openings in the tank and then to pot-furnaces for drawing in such manner as may be found most expedient. It might here be stated that it is desirable to provide the molten glass in the tank with a float-ring to localize the portion of the glass which is to be withdrawn from the tank in the operation of dipping it out by means of the pot, any overflow or spilling in the dipping operation being caused to drip to the main body of the glass in the tank outside of the float-ring. Such an equalizing float-ring is disclosed, in a general way, in Mambourg and Houze's Patent No. 970633 of September 20th, 1910.

While I have disclosed a glass plant of rather extended character suited for the employment of quite a number of drawing machines and pots and pot-furnaces, the fundamental principle of my improvements may be realized, to an extent, in case there is but a single drawing machine and a single pot-furnace and a single dipping opening in the ends of the tank, and a reheating furnace adapted for the reheating of but one pot at a time. The apparatus particularly set forth is to be considered as being merely an exemplification of my invention. I have sought to set forth the principle of my invention and the best mode in which I at present contemplate embodying that principle.

I claim:—

1. A glass plant comprising, a melting tank provided with a charging-opening and having a dipping-opening adapted to permit the passage of a combined dipper and drawing-pot, a reheating furnace having a floor draining toward the tank and having an opening adapted to permit the passage of the combined dipper and drawing-pot, a conduit placing the reheating furnace in communication with the tank and having a floor sloping from the floor of the reheating furnace to the tank, a pot-furnace adapted to separably support the combined dipper and drawing-pot in position to have the pot dipped into by the bait of a drawing machine, a combined dipper and drawing-pot adapted for support in the pot-furnace and for passage through the dipping-opening in the tank and through the opening in the reheating furnace, and engaging devices on the combined dipper and drawing-pot to permit of its being handled either side up, whereby the pot may dip glass from the tank and be then disposed in the pot-furnace and be drawn from by the drawing machine and be then transferred to and inverted into the reheating furnace and the residual glass from the inverted pot drained into the tank, combined substantially as set forth.

2. A glass plant comprising, a melting tank provided with a charging-opening and having a dipping-opening adapted to permit the passage of a combined dipper and drawing-pot, a reheating furnace having a floor draining toward the tank and having an opening adapted to permit the passage of the combined dipper and drawing-pot, a conduit placing the reheating furnace in communication with the tank and having a floor sloping from the floor of the reheating furnace to the tank, a pot-furnace adapted to separably support the combined dipper and drawing-pot in position to have the pot dipped into by the bait of a drawing machine, a combined dipper and drawing-pot adapted for support in the pot-furnace and for passage through the dipping-opening in the tank and through the opening in the reheating furnace, engaging devices on the combined dipper and drawing-pot to permit of its being handled either side up, piers disposed in the reheating furnace and projecting above the floor thereof and adapted to support the pot in inverted condition, and piers disposed in the pot-furnace and adapted to support the pot and its charge of glass while being drawn upon by the drawing machine, whereby the pot may dip glass from the tank and be then disposed in the pot-furnace and be drawn from by the drawing machine and be then transferred to and inverted into the reheating furnace and the residual glass from the inverted pot drained into the tank, combined substantially as set forth.

LEOPOLD MAMBOURG

Witnesses:
W. O. TAYLOR,
S. CASPARIS.

Copies of this patent may be obtained for five cents each, by addressing the "Commissioner of Patents, Washington, D. C."